United States Patent Office 3,092,668
Patented June 4, 1963

3,092,668
ISOMERIZATION OF ALKYLENE OXIDE
Herman A. Bruson, North Haven, and William I. Denton, Cheshire, Conn., assignors to Olin Mathieson Chemical Corporation, New Haven, Conn., a corporation of Virginia
No Drawing. Filed May 2, 1960, Ser. No. 25,909
7 Claims. (Cl. 260—632)

This invention relates to the catalytic conversion of gaseous alkylene oxide containing 3 to 5 carbon atoms to an isomeric alcohol, for example, propylene oxide to allyl alcohol, and particularly to an improved process therefor using a highly efficient catalyst rendered suitable for use by a novel treatment with liquid solvent.

In this type of process, the prior art catalysts have been characterized by insufficient extents of conversion and inadequate production capacity to make them commercially attractive. Thus, the trilithium phosphate catalyst to U.S. 2,426,264 was disclosed as resulting in the conversion at each pass of only about 17 to 21% of the propylene oxide feed to allyl alcohol, at production rates of 60 to 179 grams of allyl alcohol per liter of catalyst per hour.

The main object of this invention has been to provide a catalytic process for the conversion of propylene oxide to allyl alcohol using an efficient catalyst which is capable of activation to produce a high extent of conversion at each cycle and characterized by large productive capacities and high ultimate yields of allyl alcohol from the propylene oxide feed.

A further object has been to provide a novel method of activating a relatively inactive catalyst to high efficiency in the above type of isomerization process.

Another object has been to provide such an activation process enabling the efficient re-use of catalyst for extended periods of high productivity.

The foregoing and other objectives have been accomplished in that extents of conversion of oxide to alcohol in each cycle of 60% to about 85% with ultimate yields of 83% to 95%, and production rates of 250 to about 2100 grams of alcohol per liter of activated catalyst per hour have been attained. Furthermore, in accordance with the present invention, an efficient activation process has been provided to improve or restore catalysts whose activity had been decreased by use.

Highly effective catalysts for this type of conversion comprise leached basic lithium phosphate as described in detail in copending application Serial No. 803,792, filed April 2, 1959, now U.S. Patent 2,986,585, issued May 30, 1961. The preparation involves the precipitation of a basic lithium phosphate, preferably by double decomposition in the presence of at least 0.2 mole, preferably 1 to 2 moles of alkali metal hydroxide or other basic compound per mole of lithium orthophosphate. The precipitate is then leached three to five times with a large volume of water, preferably at a temperature of 50° to 95° C. The resulting highly effective leached basic lithium phosphate catalyst has essentially a composition corresponding to lithium orthophosphate, but contains residual excess alkali metal hydroxide or other basic compound equivalent to 0.05 to 1% by weight of the alkali metal.

In the evaluation of catalyst prepared by various methods for use in the isomerization of an alkylene oxide to the corresponding unsaturated alcohol, the activity of the catalyst is measured by the extent of conversion of oxide to alcohol per pass through the reactor. Thus, a fairly active catalyst results in over 40% conversion and a catalyst of excellent activity can result in the conversion of up to about 85% of the oxide to alcohol for each pass through the catalyst bed.

The selectivity of the catalyst is likewise of great importance in view of the possibility of other conversions, it being well known for example that alkylene oxides can be isomerized to aldehydes as well as other carbonyl compounds. The occurrence of such side reactions results in the consumption of the starting alkylene oxide to products other than the desired alcohol. With the use of a highly selective catalyst, such side reactions are suppressed, so that unconverted alkylene oxide can be recovered and again passed through the reactor, resulting in ultimate yields of alcohol as high as over 90% to 95% of the starting oxide.

The ultimate yield, which is thus a measure of the selectivity of the catalyst can be determined by dividing the weight of the alcohol obtained by the weight of oxide consumed (weight of recovered oxide subtracted from the weight passed through the reactor) or, generally more conveniently, by dividing the weight of the alcohol product by the total weight of all products other than recovered oxide. For commercial success, the catalyst should be sufficiently selective as to result in ultimate yields of the desired alcohol product amounting to over 80 to 95%, preferably over 85%.

The improved process using the leached basic lithium phosphate catalyst provides excellent results at reaction temperatures within the range of about 250° to 350° C., preferably at about 275° C. to 300° C.

The rate of feed of liquid alkylene oxide may be varied from space velocities of about 0.3 to 2.0, preferably 0.5 to 1.0. Space velocity is defined herein as the volume of liquid feed per hour divided by the volume occupied by the catalyst. Residence time in the reaction zone within the above range amounts to about 2 to 50 seconds.

The catalyst will undergo a gradual decrease in activity with extended use. However, the selectivity of the present catalyst is not significantly impaired even after extended use, so that the ultimate yield of the desired alcohol remains high. Thus, while frequent regeneration is not essential, it is generally economical to restore the activity by suitable treatment when the conversion per pass had decreased to a value of 30 to 45%. Such a point may be reached after use of the catalyst for 24 to 48 hours or, expressed differently, after the catalyst has converted about 10 to 15 times its weight of oxide to alcohol.

In accordance with this invention, catalysts of initially inadequate effectiveness or which have been somewhat inactivated by use may readily be made highly effective by treatment, generally at an elevated temperature with a liquid hydrocarbon solvent containing six or more carbon atoms per molecule, particularly with liquid aromatic hydrocarbons, as, for example, benzene, toluene, xylene or mesitylene. Catalysts may be recycled many times in this manner, and after fifty or more cycles, still display values of activity and selectivity as high as originally, or at times even higher.

It is noteworthy that attempts to activate or regenerate by heating the catalyst in air, or air mixed with oxygen or steam, or oxygen mixed with steam, as disclosed in U.S. 2,426,264, have been unsuccessful when applied to catalysts of initially high effectiveness. For example, a leached basic lithium phosphate catalyst which displayed an initial activity of 61 (61% of the propylene oxide passed once through the catalyst bed was converted to allyl alcohol) and a selectivity of 85 (85% of the propylene oxide passed cyclically through the catalyst bed yielded allyl alcohol in the product) was used in the process until the activity and selectivity had decreased, respectively, to 43 and 80. The catalyst was then heated for 16 hours in a current of air with the bed temperature regulated at 350° C., resulting in peak temperatures within the bed of 375° C. The so-treated catalyst was then found to be characterized by decreased activity and selectivity of 29 and 62, respectively. Similarly, a catalyst was used for 50 hours and suffered a loss in activity from 65.2 to 37.1 and in selectivity, from 86 to 82. Treatment thereof with air at 290° C. for 60 hours, and then at 315° C. for 3 hours effected a further decrease in the activity to 34.7 and in the selectivity to 59, instead of activation.

While activation or regeneration of used catalyst can be effected by the use of oxygen-containing solvents, preferably containing not more than six carbon atoms per molecule, as disclosed in copending application Ser. No. 818,557, filed June 8, 1959, such treatments have been found most effective when applied at moderate temperatures, generally above 125° C. and not higher than 175° C. At higher temperatures, such solvents tend to undergo reactions which produce resinous deposits on the catalyst thereby increasing the resistance to flow of gas therethrough. The necessity thus created for carrying out the regeneration of catalyst at below about 175° C., while the catalytic conversion reaction is carried out at about 250° to 300° C. has imposed undesirable delays and increased energy requirements in commercial-scale operations.

It has now been found that activation or restoration of catalyst can be efficiently carried out at about the temperature of the isomerization reaction by the use of hydrocarbon solvents containing at least six, and preferably at least eight, carbon atoms per molecule. While aromatic hydrocarbon solvents such as benzene, toluene, xylene and mesitylene are most effective, saturated and partly saturated cyclic hydrocarbons, such as decahydronaphthalene, tetrahydronaphthalene, and dimethylcyclohexane and paraffinic hydrocarbons such as the octanes, n-decane, and the dodecanes constitute excellent solvents for this purpose, particularly at elevated temperatures.

The use of the above-described hydrocarbon solvents is particularly advantageous in a number of respects. The activation treatment can readily be effected at about the reaction temperature so that the catalyst need not be cooled for regeneration and then be re-heated to the operating temperature. Repeated cycles of such regeneration treatments restore the desired operating characteristics consistently and, in particular, the formation of resinous deposits encountered with other solvents is avoided. Also, the catalyst may be used in the isomerization reaction for longer periods of time, for example for 90 hours rather than for 24 to 60 hours previously advisable, without preventing the full restoration of the desired catalytic properties by a regeneration treatment with liquid hydrocarbon.

Although some improvement is effected by treatment of the catalyst at moderate temperatures, best results are obtained at elevated temperatures of about 200° to 300° C., preferred range being 225° to 275° C. At temperatures above the normal boiling point of the solvent, which may extend up to about 25° C. below the critical temperature, pressures sufficiently greater than atmospheric must be used so as to maintain the solvent in the liquid phase.

The proportion of solvent to catalyst under treatment may be varied for effective results between rather wide limits depending largely on the extent of fouling. Generally 1 to 25 volumes of solvent are used per volume of catalyst, preferably 10 to 20 volumes under usual operating conditions. However, higher volume ratios may be desirable at times, as when a catalyst has been extensively fouled by use for over 100 hours, when the use of 30 volumes of solvent per volume of catalyst may be necessary.

The treatment is generally applied by circulating fresh liquid through the catalyst, generally for 2 to 10 hours. The volume ratio may be reduced to less than 5 volumes of solvent per volume of catalyst when the latter has been used in the process for periods not exceeding about 90 hours or by recirculating the solvent. Lower volume ratios are also used when the regeneration is carried out by a customary extraction procedure wherein the solvent is distilled from the extract, condensed as pure solvent, and the latter is caused to flow through the catalyst.

The regeneration is most practically effected without removing the catalyst bed from the isomerization apparatus, the activating solvent being caused to pass through the catalyst bed while the latter is maintained in position. Thus, any need for dismantling the isomerization apparatus and the removal of catalyst is avoided. Also, the required activation temperature is readily controlled by the regulatable heating units available in the chamber housing the catalytic bed. By effecting the treatment at about the isomerization temperature, loss in time and energy in cooling and heating the catalyst is avoided.

The useful liquid hydrocarbon solvents are those containing at least six carbon atoms per molecule, and preferably, eight to twelve carbon atoms per molecule. The most highly effective solvents are the aromatic hydrocarbons, particularly the methyl-substituted aromatic hydrocarbons.

Such liquids have the required activating effect and stability, and are readily removed from the catalyst by volatilization after the treatment has been completed, by lowering the pressure and, if necessary, by passing a stream of inert gas, for example, nitrogen or carbon dioxide through the catalyst. Less volatile liquid hydrocarbons, containing more than twelve carbon atoms, may be used for the activating treatment, although generally requiring an additional step for removal. In such cases, following the treatment, the liquid is removed from the catalyst by washing thoroughly with a more volatile solvent, and the latter is subsequently removed by volatilization.

In the following specific examples, catalysts were evaluated for effectiveness by passing propylene oxide through a bed thereof at a temperature of 275° C., at atmospheric pressure and at a space velocity of about 0.55, unless otherwise noted. The evaluations of catalyst before and after a given regeneration treatment were carried out under identical conditions in each case. The product was analyzed for its content of allyl alcohol, recovered propylene oxide, and other carbonyl-containing compounds. The activation treatment with solvent was applied to 120 cc. lots of catalyst, generally after use in the isomerization process under the conditions as described above for about 30 to 60 hours. This produced in each case a corresponding reduction from the initially high catalytic activity, which was subsequently restored by the treatment with liquid hydrocarbon solvent.

TABLE I

*Hydrocarbons as Regeneration Solvents*

| Example | Regeneration Solvent | Regeneration Temp.; °C. | Allyl Alcohol Yield, Percent | | | |
|---|---|---|---|---|---|---|
| | | | Before Regeneration | | After Regeneration | |
| | | | Per Pass | Ultimate | Per Pass | Ultimate |
| | Aromatic Hydrocarbons | | | | | |
| 1 | Benzene | 200 | 53.0 | 89.7 | 70.3 | 90.4 |
| 2 | Toluene | 200 | 45.2 | 90.1 | 60.3 | 90.5 |
| 3 | Xylene | 30 | 53.6 | 92.2 | 63.4 | 91.0 |
| 4 | ----do---- | 150 | ¹18.1 | 81.5 | ¹55.9 | 88.8 |
| 5 | ----do---- | 200 | 32.8 | 91.4 | 67.3 | 89.4 |
| 6 | ----do---- | 230 | 16.3 | 88.1 | 60.6 | 88.0 |
| 7 | ----do---- | 250 | 43.6 | 87.6 | 65.6 | 91.6 |
| 8 | Para-xylene | 250 | 37.4 | 86.6 | 54.6 | 89.3 |
| 9 | Mesitylene | 150 | 49.4 | 89.5 | 65.8 | 89.4 |
| 10 | Mesitylene (1,2,4 trimethyl benzene) | 250 | 39.5 | 90.8 | 62.6 | 90.4 |
| | Aromatic Cycloparaffin | | | | | |
| 11 | Tetrahydronaphthalene | 150 | 46.3 | 91.0 | 57.6 | 90.6 |
| 12 | ----do---- | 200 | ²22.4 | 91.5 | ²40.1 | 89.2 |
| | Cycloparaffin | | | | | |
| 13 | Decahydronaphthalene | 150 | 37.0 | 90.5 | 42.8 | 92.1 |
| 14 | ----do---- | 250 | 48.8 | 92.6 | 65.1 | 91.0 |
| | Paraffin | | | | | |
| 15 | n-decane | 150 | 26.6 | 89.6 | 51.4 | 90.0 |
| 16 | ----do---- | 250 | ²21.0 | 93.2 | ²33.8 | 92.0 |

¹ Space velocity of 0.7 at 265° C.
² Space velocity of 1.0 at 275° C.

The regenerations in the above examples were effected by circulating the solvent through the catalyst at a rate of 10 cc. per minute for 2 hours at the indicated temperature and at a pressure of 300 pounds per square inch gauge or higher, sufficient to maintain the solvent in the liquid phase.

The liquid hydrocarbon solvents which are most effective are those containing six to twelve carbon atoms per molecule, or mixtures of such liquid solvents, and particularly the liquid aromatic hydrocarbons containing up to twelve carbon atoms per molecule. Such liquid solvents display the desired activation of the catalyst at treating temperatures within the range at which the isomerization reaction is carried out. They are characterized by high stability in contact with the catalyst at such elevated temperatures, being free of resinification reactions displayed by oxygen-containing solvents and free of catalyst-poisoning effects resulting from the use of solvents containing halogen or sulfur.

The liquid hydrocarbons as above specified are likewise characterized by existing in the liquid phase at reasonable pressures of not over about 25 atmospheres at the desired operating temperatures of 225° to 275° C., and up to about 300° C. Also, the volatility is sufficiently high so that following the regeneration treatment, the residual solvent in the activated catalyst vaporizes when the pressure is relieved to atmospheric. Traces of solvent can be readily removed by subjecting the heated catalyst to vacuum or by means of slow stream of inert gas, such as nitrogen, for 30 to 60 minutes or of a rapid stream for a shorter time.

In the case of liquid solvents existing in different isomeric forms, any of the isomers or mixtures thereof may be used. Thus, p-xylene has been shown to be highly effective, as well as isomeric xylene mixtures. The xylene used in the above Examples 3–7 had the following composition:

16% by weight o-xylene
25% by weight p-xylene
55% by weight m-xylene
4% by weight ethylbenzene However, the proportion of the isomers as well as content of other hydrocarbons may be varied without any deleterious change in the effectiveness for the purposes of this invention.

When the liquid hydrocarbon comprises aromatic compounds having an alkyl substituent, those having methyl substituents are preferred for greatest effectiveness and stability in the treatment cycle.

In order to facilitate the purification of the solvent by distillation, use is preferably made of a substantially pure single compound or of a mixture characterized by a narrow range of boiling points, usually not more than 20° or 30° C. Frequently, advantage may be had by the use of a mixture of liquid hydrocarbons providing substantially an azeotropic composition.

The activation process of this invention is likewise advantageous for the treatment of catalyst for the isomerization of butylene oxide and amylene oxide, particularly the 1,2 oxides, to the corresponding isomeric alcohols.

Modifications in the above detailed procedures will be apparent to those skilled in the art and are included within the scope of the following claims.

What is claimed is:

1. In the isomerization of an alkylene oxide containing 3 to 5 carbon atoms to the corresponding alcohol,
wherein said oxide is contacted in the gaseous state with a leached basic lithium phosphate catalyst at a temperature of about 250° C. to 350° C.,
said catalyst initially having an activity effecting more than 40% conversion in a single pass and gradually decreasing in effectiveness during use,
and wherein the said isomerization is interrupted for catalyst activation,
the process of restoring substantially the initial catalyst activity consisting essentially of contacting the catalyst after use in said isomerization with a liquid hydrocarbon, containing at least six carbon atoms, selected from the group consisting of aromatic, paraffinic and saturated cyclic hydrocarbons, at a temperature of about 200° C. to about 25° C. below the critical temperature of said hydrocarbon, and at a pressure sufficient to maintain said hydrocarbon in the liquid phase, said liquid hydrocarbon being volatile at the said temperature, and then removing the said hydrocarbon from the activated catalyst.

2. In the isomerization of propylene oxide to allyl alcohol,
wherein said oxide is contacted in the gaseous state with a leached basic lithium phosphate catalyst at a temperature of about 250° C. to 350° C.,
said catalyst effecting more than 40% conversion in a single pass and gradually decreasing in effectiveness during use, and wherein the said isomerization is interrupted for catalyst activation,
the process of restoring substantially the initial catalyst activity consisting essentially of contacting the catalyst after use in said isomerization with a liquid hydrocarbon, containing at least six carbon atoms, selected from the group consisting of aromatic, paraffinic and saturated cyclic hydrocarbons, at a temperature of about 200° C. to 300° C. and at a pressure sufficient to maintain said hydrocarbon in the liquid phase, said liquid hydrocarbon being volatile at the said temperature, and then removing the said hydrocarbon from the activated catalyst.

3. The process of claim 1, wherein the activation process is carried out at about the temperature of the isomerization reaction.

4. The process of claim 1, wherein the hydrocarbon is removed by volatilization from the activated catalyst.

5. The process of claim 1, wherein the said liquid hydrocarbon is decahydronaphthalene.

6. The process of claim 1, wherein the said liquid aromatic hydrocarbon is a methyl-substituted benzene.

7. The process of claim 1, wherein the said liquid aromatic hydrocarbon is xylene.

References Cited in the file of this patent

UNITED STATES PATENTS 2,426,264     Fowler et al. _____ Aug. 26, 1947